US008559052B2

United States Patent
Jacob et al.

(10) Patent No.: US 8,559,052 B2
(45) Date of Patent: Oct. 15, 2013

(54) AUTOMATED LAYOUT AND DESIGN FOR RECORDING TEXT AND IMAGES IN ANY OF DISPARATE THREE-DIMENSIONAL OBJECTS

(75) Inventors: Karl Jacob, Tiburon, CA (US); Mark Halstead, Auckland (NZ)

(73) Assignee: Coveroo, Inc., San Francisco, CA (US)

( * ) Notice: Subject to any disclaimer, the term of this patent is extended or adjusted under 35 U.S.C. 154(b) by 347 days.

(21) Appl. No.: 12/910,610

(22) Filed: Oct. 22, 2010

(65) Prior Publication Data

US 2011/0096341 A1   Apr. 28, 2011

Related U.S. Application Data

(60) Provisional application No. 61/255,423, filed on Oct. 27, 2009.

(51) Int. Cl.
*G06F 15/00* (2006.01)
(52) U.S. Cl.
USPC .......................................... 358/1.6

(58) Field of Classification Search
USPC .......................................... 358/1.6
See application file for complete search history.

(56) References Cited

U.S. PATENT DOCUMENTS

| 7,131,533 | B2 | 11/2006 | Anderson et al. |
| 7,216,092 | B1 | 5/2007 | Weber et al. |
| 2003/0160819 | A1* | 8/2003 | Chase .......................... 345/744 |
| 2005/0116334 | A1 | 6/2005 | Buehler |
| 2008/0041101 | A1 | 2/2008 | Chen et al. |
| 2008/0136160 | A1 | 6/2008 | Leenders |

* cited by examiner

*Primary Examiner* — Saeid Ebrahimi Dehkordy
(74) *Attorney, Agent, or Firm* — Michael A. Glenn; Perkins Coie LLP

(57) ABSTRACT

Systems and methods for providing automated layouts and designs for recording text and images on any of a plurality of disparate three-dimensional objects. Server-based processing engine for automatically imposing designs and text onto consumer electronic devices and method for delivering the same to consumers.

28 Claims, 15 Drawing Sheets

```
create output file in desired format
y_pos := vertical border offset for each row in grid do:
        x_pos := horizontal border offset
        for each column in grid do:
                fetch next job in job list
                read job design file and insert into output file
                compute bounding box of design in output file: job_design_box
                read job device template file
                compute bounding boxes for:
                        device (device_box)
                        design (design_box)
                        text (text_box)
                        with text design (wtext_design_box, if it is defined)
                compute translation that lines up device_box top left corner with (x_pos, y_pos)
                apply translation to design_box, text_box, and wtext_design_box
                        these are the desired bounding boxes within the layout grid
                choose target_box for design:
                        if job has text and wtext_design_box is defined
                                choose wtext_design_box;
                        else
                                choose design_ box
                compute translation and scale that will transform job_design_box to fit target_box (see below
for definition of fit)
                apply it to design in output file if job has text
                        create text with desired content and font and insert definition into output file
                        compute bounding box of text as job_text_box
                        compute translation and scale that will transform job_text_box to fit text_box
                        apply it to text in output file
                end if x_pos = x_pos + horizontal grid separation
        end for y_pos = y_pos + vertical grid separation
end for save file in desired output format
```

AUTOMATED LAYOUT AND DESIGN FOR RECORDING TEXT AND IMAGES IN ANY OF DISPARATE THREE-DIMENSIONAL OBJECTS

CROSS REFERENCE TO RELATED APPLICATIONS

This application claims priority from U.S. Provisional Patent No. 61/255,423, filed Oct. 27, 2009, the entirety of which is herein incorporated by this reference thereto.

BACKGROUND OF THE INVENTION

1. Technical Field

The invention relates to systems and methods for providing automated layout and design of recording text and images on three-dimensional objects. More specifically, the invention relates to scalable systems and methods for automatically imposing and printing custom designs on a plurality of disparate objects via browser-based interfaces or stand alone kiosks.

2. Description of the Prior Art

The use of personal electronic devices is becoming increasingly ubiquitous in modern cultures. Likewise, there is an upward trend for owners of the devices to personalize and accessorize their devices. For example, as consumers' environments have changed to include more frequent beeps and buzzes from cellular phone calls, text message notifications, and electronic calendar applications, many consumers rely on unique ringtones to differentiate their personal electronic device from the noise. Similarly, many consumers choose to personal the look of their electronic device to differentiate their device from others or as a fun way for self-expression.

One way of personalizing an electronic device is to add unique artwork or text to the outer surface of the device or to place a cover around the device. However, previous attempts to provide customized or personalized devices have fallen short in one respect or another.

Some attempts to personalize electronic devices rely on the use of a stick-on appliqué. However, there are numerous problems with using stickers to personalize an electronic device. First, personal electronic devices are typically so-frequently handled that durability is a principal concern. Stickers applied to the device with adhesive are easily scratched off and tend to fade or otherwise deteriorate. Additionally, the suppliers of a stick-on appliqué are required to make guesses about what designs will be popular and how much product to order. Indeed, if a particular design trend quickly goes out of fashion, suppliers will be left with a surplus of valueless inventory.

Another technique for personalizing an electronic device is to bond color ink, etch or engrave the device itself. However, known practices for laser engraving a device come up short to achieving commercial viability.

Known laser engraving, color printing, and impact printing systems comprise a printer connected to a computer that is operated by a trained technician. The technician loads artwork onto the machine via a hard drive or downloaded from a network database. The technician is then required to manually edit the artwork using a third party software graphics application. However, oftentimes the graphics applications are difficult to learn and create opportunities for user error. For example, a technician might get the measurements wrong for the art, the device, or the template.

Additionally, the laser engraving printer is a sophisticated piece of equipment that has complicated settings, i.e. speed, power and focus settings. Typically, a technician will program the speed and power, and then manually set the focus by raising and lowering the substrate tray based on experimentation. Given the sophistication of these machines, there is high degree of error when using this method.

These prior art processes are tedious and wasteful, for even a single piece of artwork engraved on a single electronic device. As explained above, consumers' tastes are constantly changing, thereby requiring the availability of numerous artwork options for a large variety of devices and compounding the deficiencies of the prior art. Clearly, known methods for imposition that require a sophisticated technician are too labor-intensive to be practical without being cost-prohibitive.

What is needed are systems and methods for providing automated layouts and designs for recording text and images on any of a plurality of disparate three-dimensional objects.

As explained above, known methods for personalizing a work piece involve an unacceptably slow process of manually moving, rotating and scaling graphics, adjusting printer settings, etc. Therefore, the need for a faster process is compounded in a retail environment because multiple consumers can simultaneously place orders and because retails consumers are not likely to wait longer than a few minutes for delivery. Accordingly, there is also a need for a retail-space solution to personalization of electronic devices using a laser-engraver.

SUMMARY OF THE INVENTION

The invention provides systems and methods for providing automated layout and design for recording text and images on three-dimensional objects without requiring the user to create custom-fitted artwork and design and without requiring the user to manually manipulate generic artwork, templates, or output settings.

Some embodiments of the invention involve a scalable, server-based system for automatically imposing and printing custom designs on a plurality of disparate objects. Some embodiments of the invention involve browser-based consumer interface for specifying the device they would like to personalize, selecting artwork, entering text and other personalization information, entering shipping information, and making payment. Some embodiments of the invention involve unique layout algorithms that use input data to create an output file that is sent to the output device.

Some embodiments of the invention involve consumers ordering personalized work pieces from home via a browser-based interface and subsequently receiving the product by mail or other type of delivery. Some other embodiments of the invention involve a point-of-sale model implemented on a standalone kiosk at an event or in a retail environment.

Some embodiments of the invention involve etching or printing on multiple device work pieces during a single print run. Some embodiments of the invention involve a system for providing automated layout and design for recording text and images on three-dimensional objects that is easily scalable.

BRIEF DESCRIPTION OF THE DRAWINGS

FIG. 1B illustrates an example browser-based interface for customizing a device according to some embodiments of the invention;

FIG. 1D illustrates an example browser-based interface for customizing a device according to some embodiments of the invention;

FIG. 1E illustrates an example browser-based interface for customizing a device according to some embodiments of the invention;

FIG. 4B illustrates an exemplary algorithm for applying designs and other customization details into a device template file according to some embodiments of the invention;

FIG. 6A illustrates examples of an interface of an operator for managing print jobs via a consultant dashboard according to some embodiments of the invention;

FIG. 6B illustrates examples of an interface of an operator for managing print jobs via a consultant dashboard according to some embodiments of the invention;

DETAILED DESCRIPTION OF THE INVENTION

As explained above, there are known methods of programming a laser engraving printer, color printer, or impact printer require an operator to manually create a unique template for a device, manually manipulate artwork, and manually adjust the printer's output settings, such as speed, power, and focus.

The invention provides systems and methods for providing automated layout and design for recording text and images on three-dimensional objects without requiring the user to create custom-fitted artwork and design or without requiring the user to manipulate generic artwork, templates, or output settings.

In the presently preferred embodiments of the invention, text and images are recorded onto consumer electronic devices such as cellular phones, laptop computers, and the like. However, it will readily apparent to those with ordinary skill in the art and having the benefit of this disclosure that the invention is equally applicable to any recordable surface.

In the presently preferred embodiments of the invention, artwork and text are automatically imposed for a laser-engraver machine to apply the design to one or more particular electronic device. However, it will readily apparent to those with ordinary skill in the art and having the benefit of this disclosure that the invention is equally useful for any type of recording process, now known or later developed.

The presently-preferred embodiments of the invention include a browser-based user interface for providing users with device customization options and a server-based processing engine for automatically customizing the device.

Figure 1A:
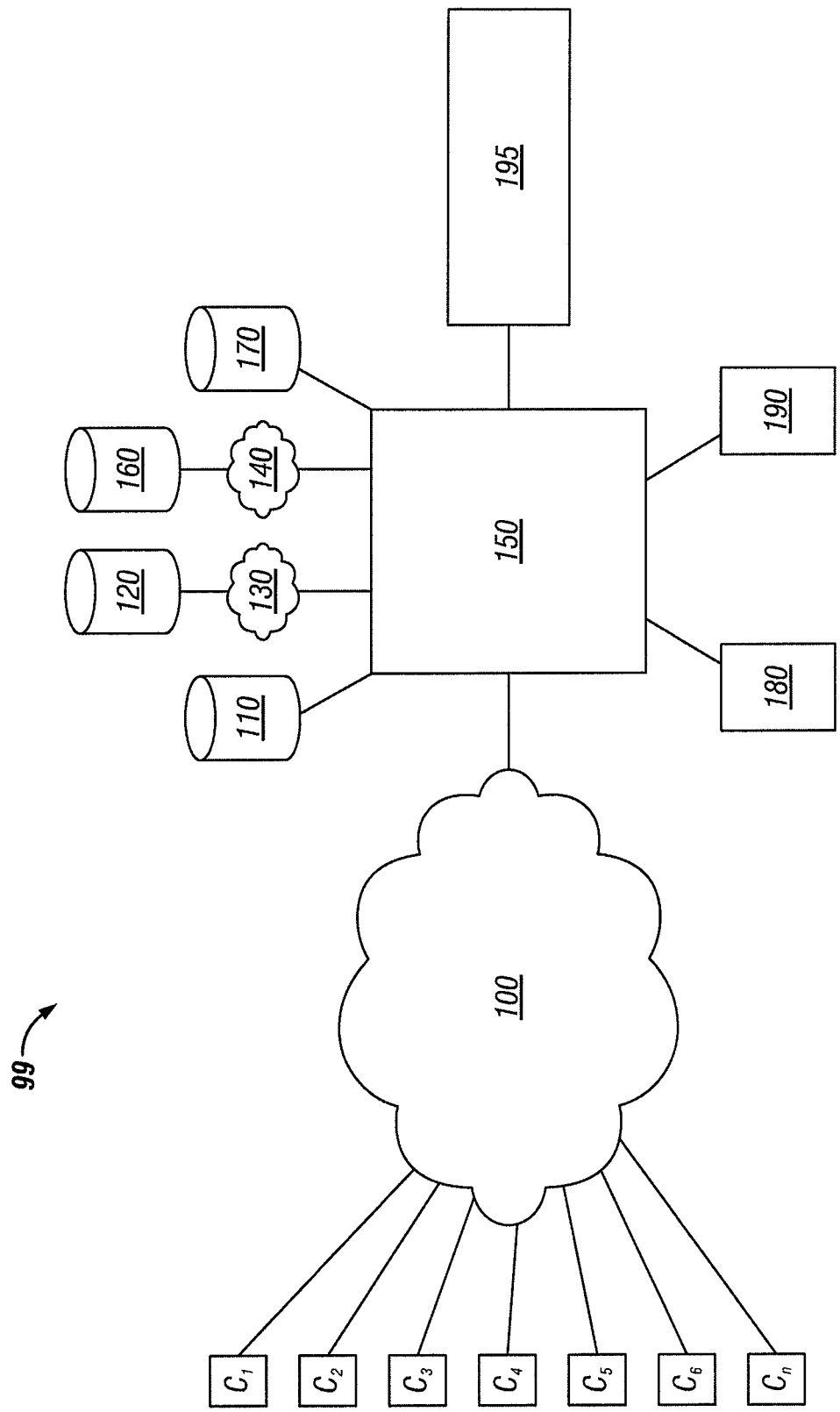
FIG. 1A illustrates a scalable, server-based system for automatically imposing and printing custom designs on a plurality of disparate objects according to some embodiments of the invention.
Figure 1B:
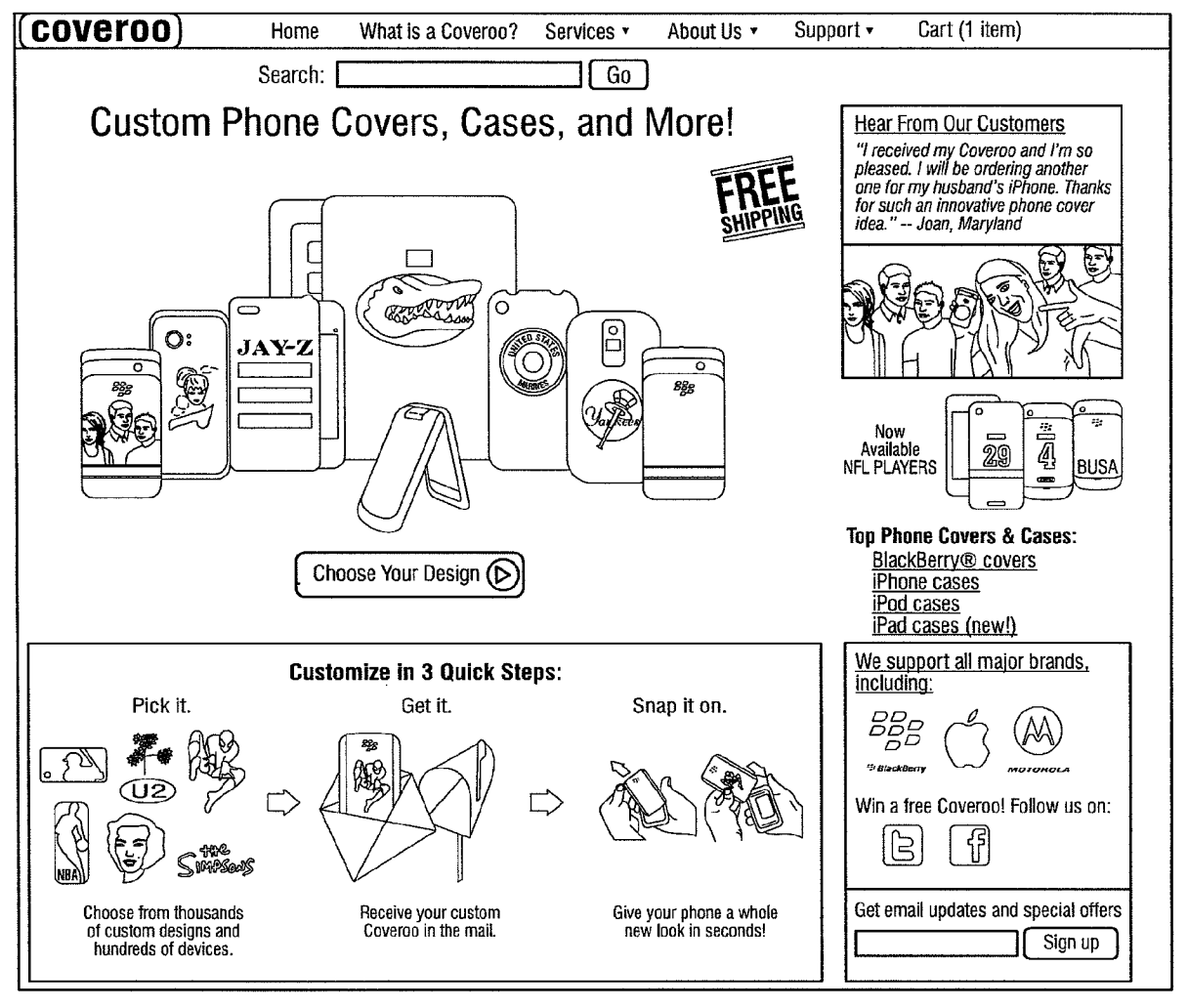
Figure 1C:
FIG. 1C illustrates an example browser-based interface for customizing a device according to some embodiments of the invention.
Figure 1D:
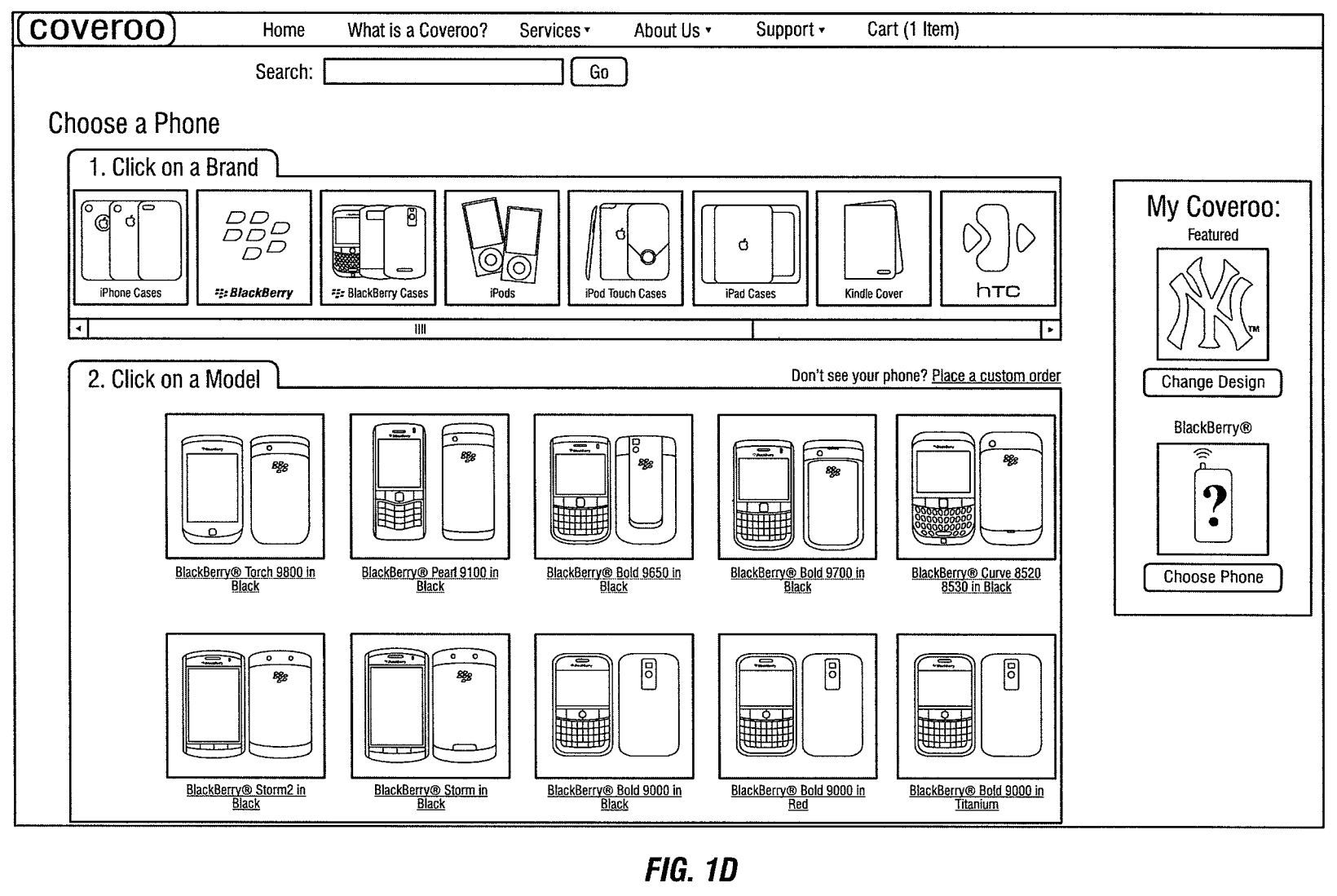
Figure 1E:
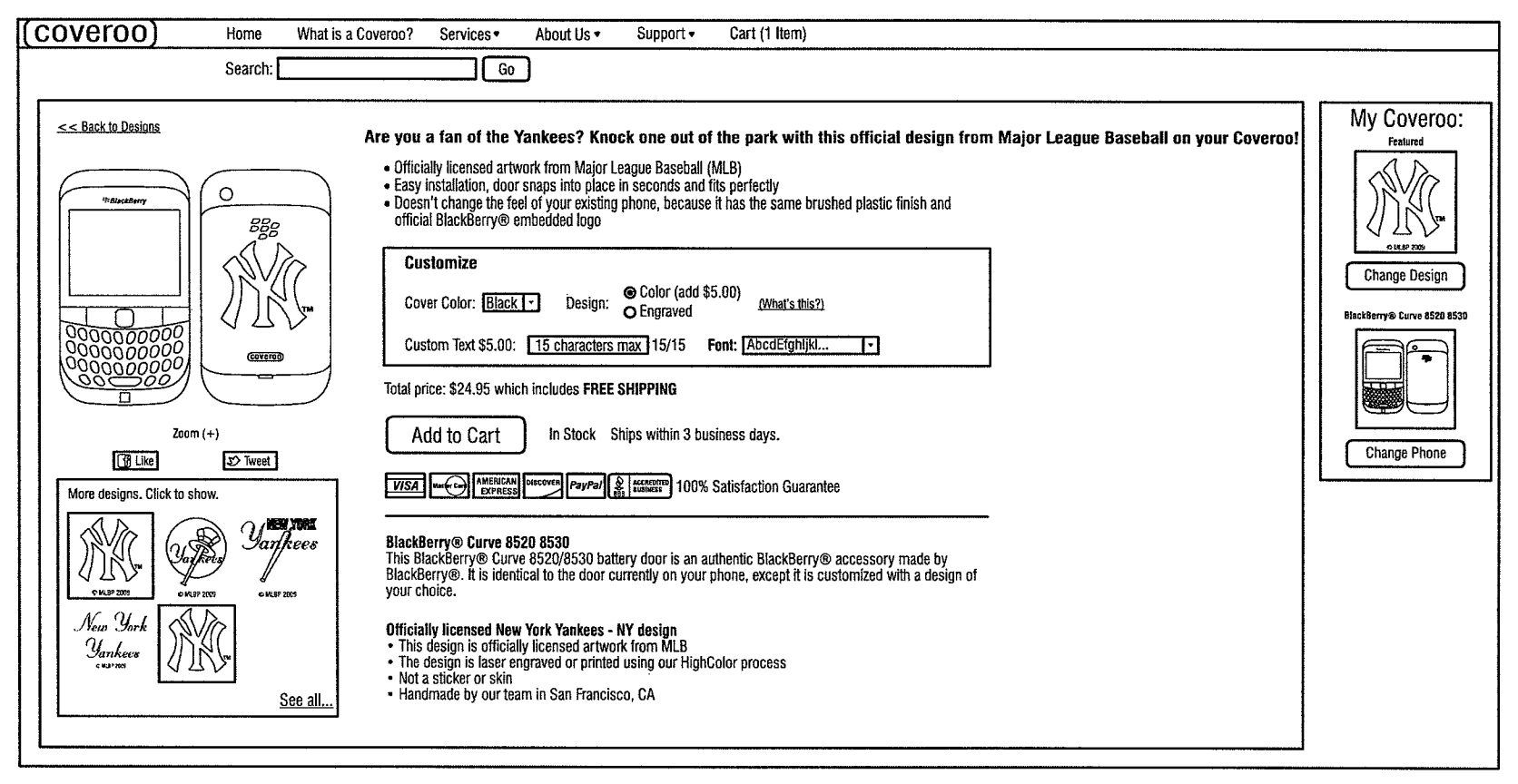

FIG. 1A illustrates a scalable, server-based system 99 for automatically imposing and printing custom designs on a plurality of disparate objects. According to FIG. 1, a plurality of customers $c_1, c_2, \ldots, c_n$ are connected to a server-based processing engine 150 via a network 100. The processing engine 150 is configured for accessing artwork, accessing processing algorithms, accessing output setting, applying algorithms to automatically create a layout imposition for laser-engraving a device. The processing engine 150 is also coupled to a laser-engraver 195 for laser engraving a device work piece.

The processing engine 150 contains at least one processor and at least one memory device. The processing engine 150 is configured for providing the customers $c_1, c_2, \ldots, c_n$ with a browser-based interface for specifying a device they would like to personalize, selecting artwork, entering text and other personalization information, entering shipping information, and making payment.

FIGS. 1B-1F illustrate an example browser-based interfaces for specifying the device they would like to personalize, selecting artwork, entering text and other personalization information, entering shipping information, and making payment.

Referring again to FIG. 1, the processing engine 150 is also coupled with one or more graphics databases 110, 120, either physically or via one or more network 130. The processing engine 150 is configured to download selected graphics and artwork from the databases 110, 120 for imposing them on a template and printing them onto a device. In some embodiments of the invention, the processing engine 150 also includes a graphics cache for storing frequently-selected or other artwork.

In some embodiments of the invention, the processing engine 150 is configured to offer customers $c_1, c_2, \ldots, c_n$ with an interface for uploading their own artwork or graphics to a browser-based workspace for imposing the uploaded art on a template and printing them onto a device.

The processing engine 150 is also coupled with one or more template databases 160, 170, either physically or via one or more networks 140. The processing engine 150 is configured to access imposition templates from the databases 160, 170. According to the presently preferred embodiments of the invention, the imposition templates comprise a general pattern of artwork and graphic placement that is specific to one or more particular electronic device.

Figure 2A:
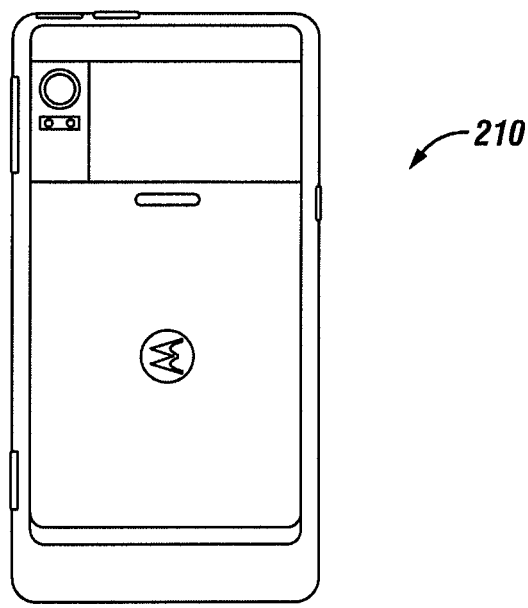
FIG. 2A illustrates the back surface of a specific consumer electronic device according to some embodiments of the invention.
Figure 2B:
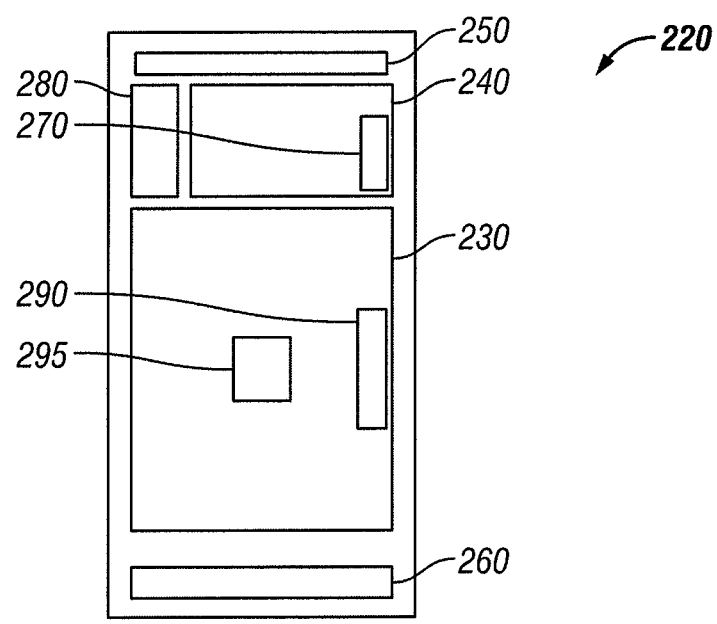
FIG. 2B illustrates an example of a template for a specific consumer electronic device according to some embodiments of the invention.

For example, suppose database 160 contains a template for the Motorola® Droid®smartphone, manufactured by Motorola, Inc. The template contains a general layout of the phone's surface features. FIG. 2A illustrates the back surface 210 of a Motorola® Droid®smartphone. FIG. 2B illustrates an example of a template 220 for a Motorola® Droid®smartphone according to some embodiments of the invention.

According to FIGS. 2A and 2B, the template 220 includes one or more boxes 270, 280, 290, and 295 dedicated for the device's symbols, trademarks, functional areas, and other non-printable surfaces. Likewise, boxes 230, 240, 250, and 260 available for engraving, etching, etc.

Referring back to FIG. 1, the presently preferred embodiments of the invention, imposition templates are pre-designed and preloaded into a dedicated template database 170.

The processing engine 150 is also coupled with an algorithm memory 180 containing a plurality of algorithms configured to move, scale, and rotate selected artwork to insert into the printable surface boxes of the selected template. An exemplary layout algorithm is explained in more detail below.

As explained above, known methods require a specialized technician to adjust output settings of an output device. Accordingly, the presently preferred embodiments of the invention automate the processing steps of adjusting output settings of output devices using the processing algorithms. As shown in FIG. 1, the processing engine 150 is also coupled with a memory device 190 containing lookup tables containing output setting for output devices.

Figure 1F:
FIG. 1F illustrates an example browser-based interface for customizing a device according to some embodiments of the invention.

As shown in FIG. 1F, the consumer interface allows consumers to place orders for custom engraving. Accordingly, the processing engine 150 is also coupled to a laser-engraver 195 for laser engraving a device work piece.

Some embodiments of the invention also involve a High-Color process for adding color to the engraved work piece. The HighColor process involves using a colored ink that is applied to the device and cured with a heat and light source. Some embodiments of the invention also involve an impact process that applies the design by impacting the surface of the device In some embodiments of the invention, the networks 100, 130, and 140 described herein comprise discrete networks. In some other embodiments of the invention, one or more of the networks 100, 130, and 140 comprise the same wide-area network.

Figure 3:
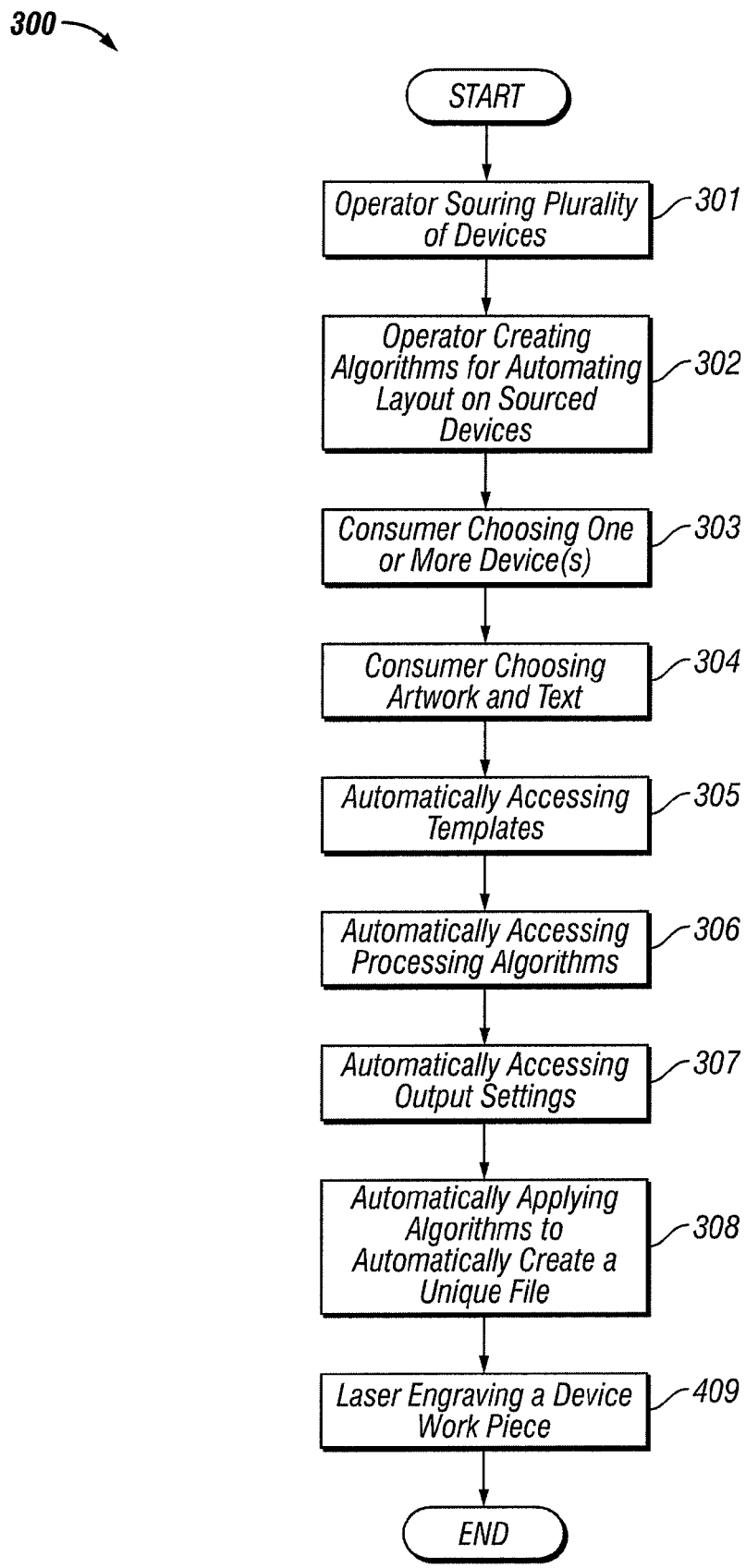
FIG. 3 illustrates a method of recording a design and text onto a three-dimensional object according to some embodiments of the invention.

FIG. 3 illustrates a method 300 of recording a design and text onto a three-dimensional object according to some embodiments of the invention. The method 300 begins with an operator sourcing a plurality of devices 301. Sourcing devices involves determining the placement and dimensions of the boxes described in the discussion of the layout algorithm described below.

The method 300 continues with an operator creating algorithms for automating layout for each of the sourced devices 302. An exemplary layout algorithm is explained in more detail below.

Once the system if set up with a collection of sourced devices and algorithms, the method 300 continues with a consumer choosing the specific device 303 that the consumer wants customized. Next, the consumer specifies the graphics and text for imposition on the selected device 304. The method 300 continues with automatically accessing one or more template 305 and automatically accessing the layout algorithms 306 for automatic imposition. Next, the processing engine automatically accesses output settings 307 for a particular output device. For example, the method 300 accesses an output device's output specification, such as speed, power and focus settings. The processing engine applies the algorithms to the chosen art, text, and output settings 308 to create a unique file that is processed by the output device to record the art and text on the device.

Finally, the method 300 involves laser engraving a device work piece 309 according to the unique file.

In some embodiments, consumers seek out the processing engine via a browser-based interface via their personal computer or mobile device using a browser. According to these embodiments, the output device is located remotely along with the processing engine, thereby requiring the finished work piece to be sent to the consumer. In some other embodiments of the invention, the interface is implemented on a standalone kiosk at an event or in a retail environment. According to these embodiments, a printer is located onsite to deliver the finished work piece on demand.

Some embodiments of the invention involve providing an operator or a consumer with authoring tools to truly customize a design. According to these embodiments, the browser-based interface include one or more tools for further manipulating a chosen design including, but not limited to blurring tools, noise adding tools, clouding tools, texturizer tools, lens flaring tools, spherizing tools, lighting effects tools, offsetting tools, filtering tools, solarizing tools, pastelizing tools, color tools, etc.

Some embodiments of the invention involve a system to automatically recognize the device placed in the kiosk using feature extraction and image recognition software. Once the type of device is recognized, the system determines the rotation and position of the device. The system then uses this orientation information to scale, rotate and position the artwork automatically. This eliminates the step of the user or operator placing the phone in a specific place in the kiosk. Some embodiments of the invention involve a clamp that automatically positions and centers the device so as to prevent errors in placing the device in exactly the correct position.

Layout Algorithm

The preferred embodiments of the invention involve layout algorithms that use input data to create an output file that is sent to the printer.

Input data include a list of all the print jobs to be laid out. Each job is described by some or all of the following information: design to be rendered, in the form of a master design input file in any of a variety of forms (i.e. gif, jpg, .pdf, .ai, .eps, etc.); device to render design on, in the form of a master device template file as described below; additional personalization data, for example: text to be rendered in the space designated in the template file, or font to be used to render the text; and horizontal and vertical border offset between edge of "page" and closest corner of rendering to induce a layout offset.

If there are two or more jobs in the list, information about the desired layout of the designs is to be provided. For example, for a grid layout, the following information is required: number of possible rows and columns in grid; and horizontal and vertical separation between boxes in the grid.

The device template file may be in a variety of formats (for example XML, text, .pdf, .ai, etc.) but must contain the following information: device bounding box; design bounding box; and text bounding box.

The device bounding box comprises geometric bounding box of device or removable piece of device, correctly aligned with the axes of the device or piece, accurate giving the dimensions of the device or piece in known units.

The design bounding box comprises a geometric bounding box within the above device bounding box defining the extent in which the design can be rendered.

The text bounding box comprises a geometric bounding box within the device bounding box defining the extent in which text can be rendered. With the text bounding box, an optional bounding box defining the extent in which the design can be rendered when text is also rendered in the text bounding box.

Figure 4A:
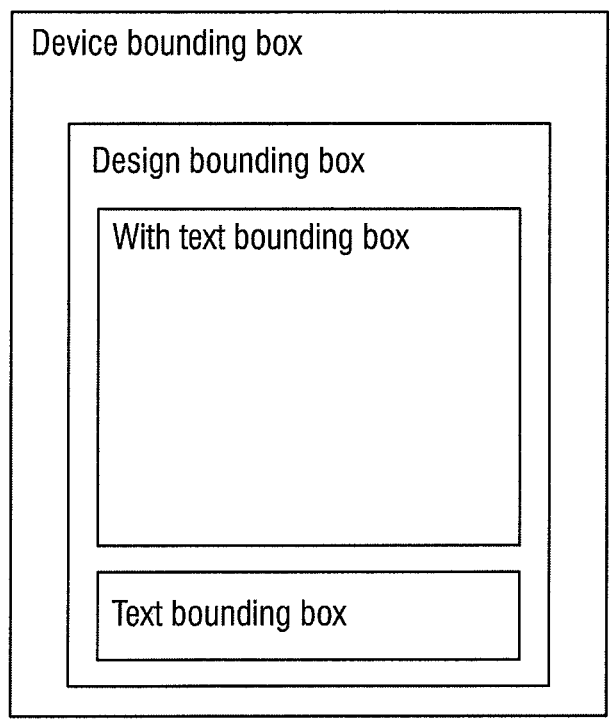
FIG. 4A illustrates an example of a device template file according to some embodiments of the invention.

FIG. 4A illustrates an example of a device template file according to some embodiments of the invention. FIG. 4B illustrates an exemplary algorithm for applying designs and other customization details into a device template file according to some embodiments of the invention. In some other embodiments, the algorithm takes printer output settings into account as well.

The algorithm described herein computes the translation and scale to be applied to one bounding box (the "origin") in order to "fit" it within another bounding box (the "destination"). This is done in the following way, assuming that a scale translation applies about the center of the design bounding box. The effect is to center the original box in the destination box and apply a uniform scaling such that the resultant box touches either the vertical or horizontal sides of the destination box and is contained within it: compute a translation that moves the center of the origin bounding box to the center of the destination bounding box' and compute scale, wherein scale=Min((width of origin)/(width of destination), (height of origin)/(height of destination)).

The layout algorithms of the invention, like the one described above, creates an output file for sending to an output device. The output is a file containing a description of the final layout. This description contains all of the input designs that will fit in the layout. The output file describes each job design—scaled and positioned to fit in the design bounding box of the job device template, unless text is also rendered for that job and the template contains a "with text" bounding box, in which case the design will be scaled and positioned to fit in the "with text" bounding box. If text is specified for the job, it will be scaled and positioned to fit within the text bounding box for the job device template. It will be in the given text font for the job. Additionally, each design will be placed relative to each other to satisfy the given layout constraints, for example in the grid case to satisfy the horizontal and vertical box separation and the horizontal and vertical page borders. The file may be in a number of different formats (for example .pdf, .eps, .ai, .png, .jpg, etc.).

Exemplary Types of Work Pieces

As explained above, previous attempts to personalize electronic devices involve the application of a sticker to the phone. However, as explained above, techniques utilizing an appliqué are inadequate. Accordingly, the invention involves a more durable and economically feasible alternative. Some embodiments involve laser-engraving electronic devices. In some embodiments, a color printing process is used to personalize electronic devices. Some embodiments involve using a colored ink that is applied to the device and cured with a heat and light sources. Some other embodiments of the invention involve an impact process that applies the design by impacting the surface of the device. The presently preferred embodiments of the invention involve laser-engraving the electronic devices.

As will be explained in more detail below, the presently preferred embodiments of the invention involve consumers ordering personalized work pieces from home via a browser-based interface and subsequently receiving the product by mail or other type of delivery.

This type of delivery model is seamless and works flawlessly with new and standalone products such as dog-tags, pendants, etc. Indeed, some embodiments of the invention involve personalizing these types of standalone items. Indeed, many of these standalone products can be mass-engraved on a single large substrate and subsequently cut into individual pieces.

However, there is also a demand for personalization of items that a consumer already owns. Prior to this invention, the consumer would have to send the item to the engraving company to be engraved and sent back. However, in the case of personalized electronics, consumers are dependent on the uninterrupted use of their device. Also, consumers frequently store personal and business sensitive information on their electronic devices. For at least these reasons, consumers are reluctant to send their device to a third party engraver company for an extended period of time.

The inventors have addressed this problem by allowing the consumers the option to design a personalized back cover and order a wholly new back cover for their cell phone or other consumer electronic device. According to this model, the company engraves a customized back cover sends the back cover to the consumer along with simple instructions for replacement, and the consumer simply removes the original cover and replaces it with the personalized cover.

The distribution model described herein is accomplished using a server-based processing module accessible by consumers via a browser-based interface.

Some other embodiments involve a consumer ordering a personalized device case. Although the Applicants expressly mention cell phone back covers and cases, it will readily apparent to those with ordinary skill in the art and having the benefit of this disclosure that any replaceable component of a consumer electronic device is similarly amenable to this distribution model.

In some other embodiments, the type of device that a consumer wants personalized does not involve replaceable panels or parts. According to these embodiments, the consumer is ultimately required to send in the device itself; however, the automatic layout and imposition of artwork for a particular device is still advantageous over prior manual solutions.

Methods of Delivery

The method and systems for providing automated layouts and designs for recording text and images on disparate objects can be carried out in various fashions including both delivery-based models as well as in point-of-sale environments.

In the delivery-based models, the output device is located remotely along with the processing engine, thereby requiring the finished work piece to be sent to the consumer. According to these embodiments, consumers seek out the processing engine via a graphical user interface via their personal computer or mobile device using a browser.

Figure 5:
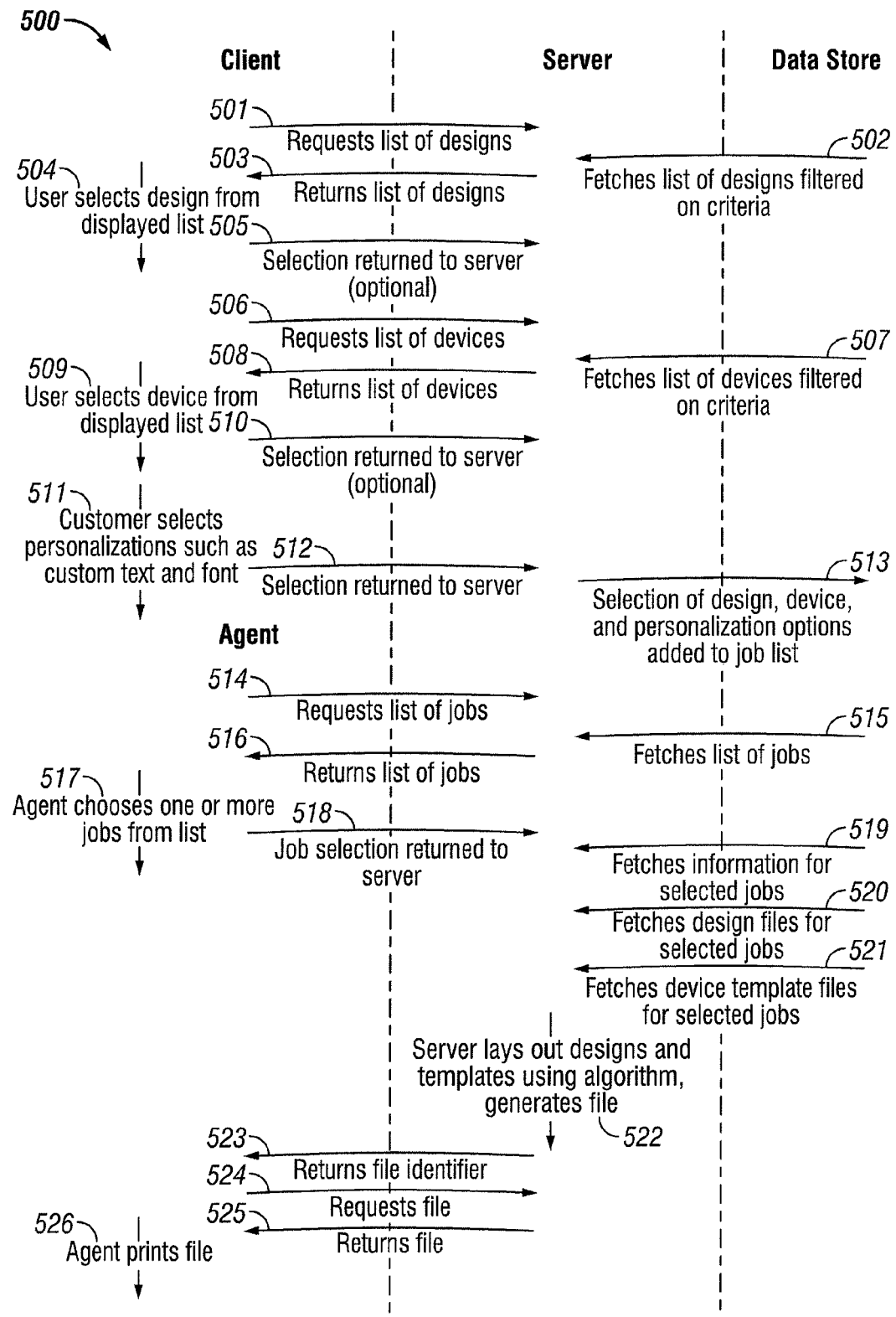
FIG. 5 illustrates a workflow of a method for carrying out the cell phone back cover replacement model according to some embodiments of the invention.

FIG. 5 illustrates a workflow of a method for carrying out the cell phone back cover replacement model according to some embodiments of the invention.

The workflow 500 is carried out in a client-server and server-agent environment with a user on a client device and an operator on an agent device. The workflow 500 begins when a client requests a list of designs 501 from a datastore via a server. The server then fetches a list of designs 502 from the datastore, wherein the list is filtered based on the client's criteria. The server returns the list of designs 503 to the client and the user selects one or more designs from the displayed list 504. In some embodiments, the selected design is returned to the server 505.

Next, the client requests a list of available devices 506 from a datastore via the server. The server fetches a list of devices 507 from the datastore, wherein the list is filtered based on the client's criteria. The server returns the filtered list of devices to the client 508, and a user selects a device from the displayed list 509. In some embodiments, the selected desice is returned to the server 510.

Next, the customer selects further personalizations, such as custom text and font 511 and the selected custom text and font is returned to the server 512. The server adds a job file to a job list 513 in the datastore, wherein the job file comprises the selection of design, device, and personalization options.

The workflow 500 continues with the operator requesting a list of jobs from an agent device 514 and the server fetches a list of jobs from the datastore 515. The server then returns the fetched list of jobs to the agent 516 and the agent specifies one or more jobs from the list of jobs 517. The agent returns the job selection to the server 518 and the server fetches information for the selected jobs from a datastore 519, fetches design files for the selected jobs 520, and fetches device template files for selected jobs 521.

The workflow 500 continues with the server-based processing engine laying out designs and templates using a unique algorithm to generate a unique file 522. The server returns a file identifier to the agent 523. The agent requests the unique file from the server 524 and the server returns the file to the agent 525. Finally, the agent initiates a print job based on the unique file 526.

In some embodiments, the same interface is used by consumers and website operators. In some other embodiments, the system is accessible by website operators via a separate administrative interface. The administrative interface may include more sophisticated tools for reviewing the impositions to ensure that algorithms are working properly, viewing pending jobs, managing pending jobs, manually adjusting settings, etc.

Figure 6A:
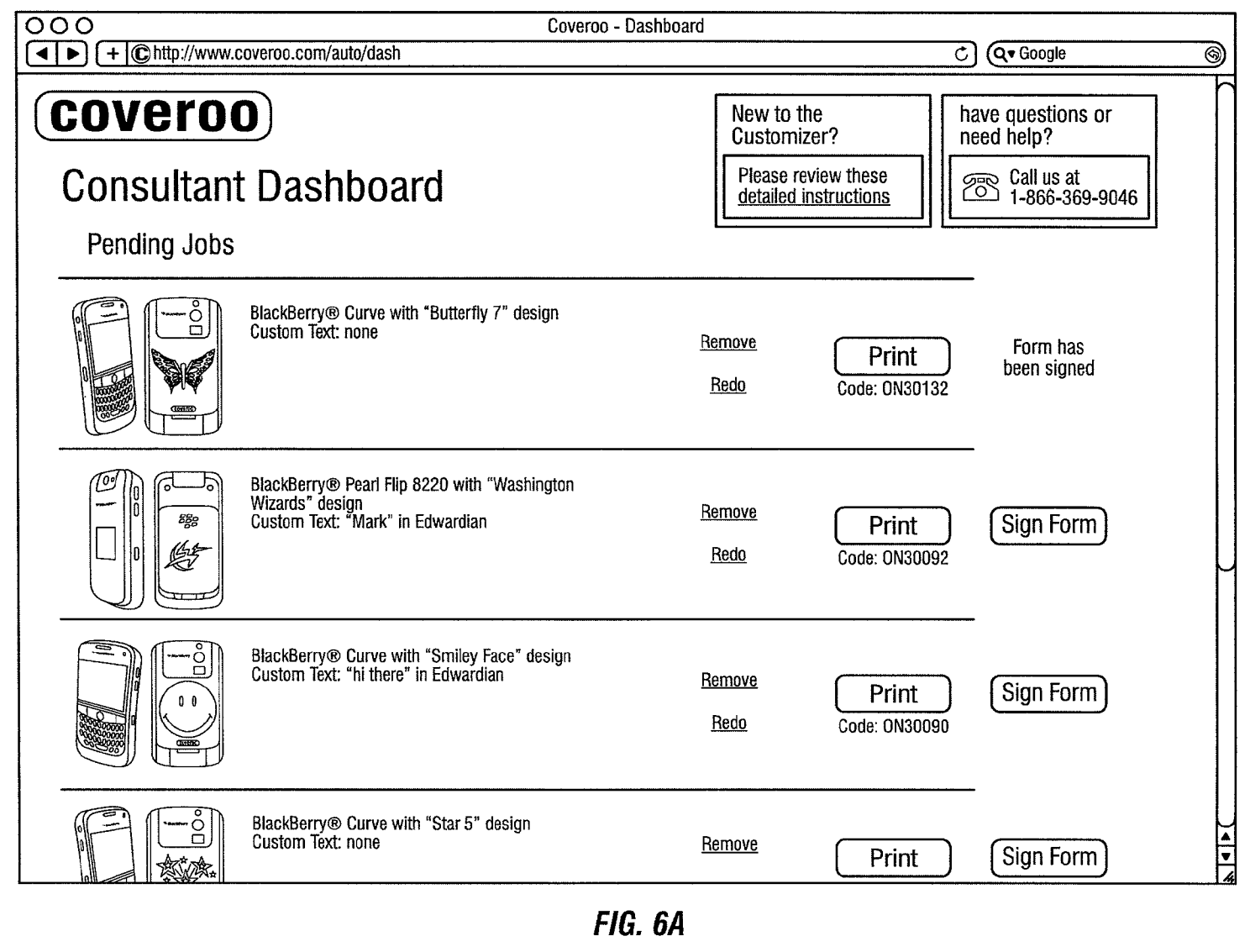
Figure 6B:
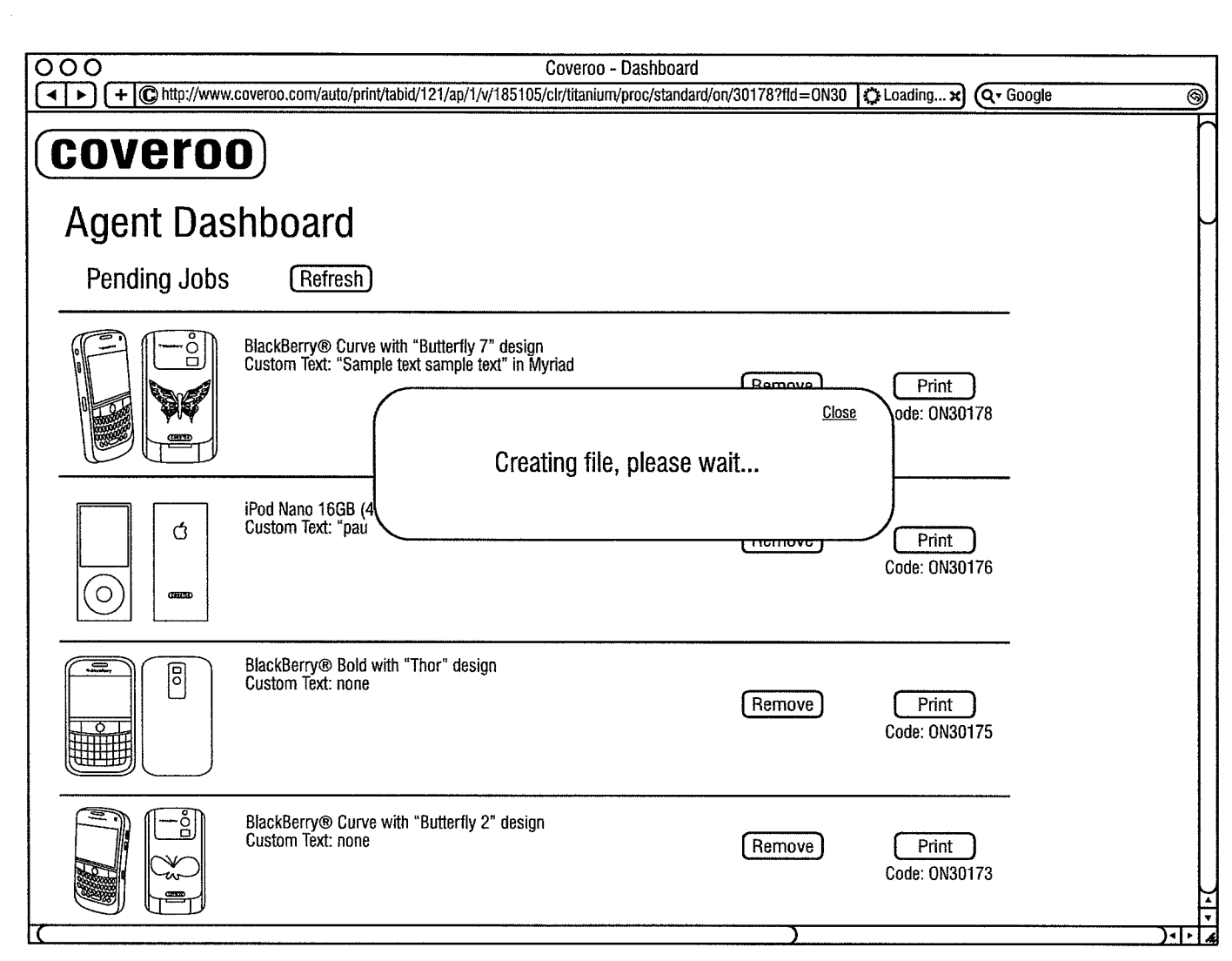
Figure 6C:
FIG. 6C illustrates examples of an interface of an operator for managing print jobs via a consultant dashboard according to some embodiments of the invention.

For example, FIGS. 6A-6C illustrate examples of an interface of an operator, aka consultant or agent, for managing print jobs via a consultant dashboard. In the presently preferred embodiments, the consultant dashboard is a browser-based interface coupled to the processing engine via the Internet.

Some other embodiments of the invention involve a point-of-sale model. According to these embodiments, the interface is implemented on a standalone kiosk at an event or in a retail environment. According to these embodiments, a printer is located onsite to deliver the finished work piece on demand.

As explained above, known methods for personalizing a work piece involves an unacceptably slow process of manually moving, rotating and scaling graphics, adjusting printer settings, etc. The need for a faster process is compounded in a retail environment. This is because multiple consumers can simultaneously place orders and because retails consumers are not likely to wait longer than a few minutes for delivery. Therefore, as explained above, there is also a need for a retail-space solution to personalization using a laser-engraver.

In some embodiments, a plurality of kiosks access the server-based processing engine via a network connection and send print jobs to an on-site centralized administrator machine. According to these embodiments, the administrator can compile the print jobs, ensure that the consumers have paid, send the print jobs back to the server-based processing engine to impose single or multiple jobs onto one or more substrates, and initiate printing.

In some embodiments of the invention, the kiosk-type delivery model is implemented during special events to provide event attendees with a souvenir. For example, a kiosk delivery system and printer can be setup at a Super Bowl event or at a launch event for a new consumer electronic product. Event attendees wishing a tangible memento of their experience can obtain a personalized collectable object by creating a customized souvenir using the kiosk.

One particular advantage to either delivery model is that the operators of the system do not need to order inventory since the kiosk customizes the consumers existing device.

As explained above, prior approaches to device customization require operators to make guesses about what designs will be popular and how much product to order. However, if a particular design trend quickly goes out of fashion, suppliers will be left with a surplus of valueless inventory.

On the other hand, the invention described herein eliminates the need for a large inventory through individually creating unique print jobs for each consumer request.

As explained above, some embodiments of the invention involve a system to automatically recognize the device placed in the kiosk and also to recognize the rotation and position of the device. The device then uses this information to scale, rotate and position the artwork automatically. This eliminates the step of the user or operator placing the phone in a specific place in the kiosk. Also, some embodiments of the invention involve a clamp that automatically positions and centers the device so as to prevent errors in placing the device in exactly the correct position.

Multiple Device Layouts

Some embodiments of the invention involve etching multiple device work pieces in a single print run. According to these embodiments, the processing engine obtains a plurality of templates for a plurality of devices and applies the appropriate layout algorithms to most-efficiently fit the plurality of templates to a single substrate. The laser engraves multiple design combinations and a finishing operation is performed to output each individual finished piece.

The multiple device layout capability is very important in the case of the kiosk distribution model. For example, it is likely that any group of point-of-sale consumers will have a wide variety of devices. Likewise, a single consumer may wish want to purchase individual pieces for each member of his family—all of whom have different devices. Similarly, multiple device layout capability is important in the remote ordering model because in the mass-production environment, it is important to be as efficient as possible.

Scalability

In the presently preferred embodiments of the invention, the system for providing automated layout and design for recording text and images on three-dimensional objects is easily scalable.

Referring again to FIG. 1, the server-based system 99 is easily scalable to accommodate newly-sourced devices and new printer output settings. For example, when a new device is developed, an operator simply creates a template according to the new device's specification and an algorithm for automating the rendering of artwork to fit into that template. The operator simply updates the template databases 160, 170 and the algorithm memory 180 with the newly developed templates and algorithms, and the processing engine 150 is automatically capable of processing art and text for the new device and the new device is simultaneously made available for consumers.

Figure 7:
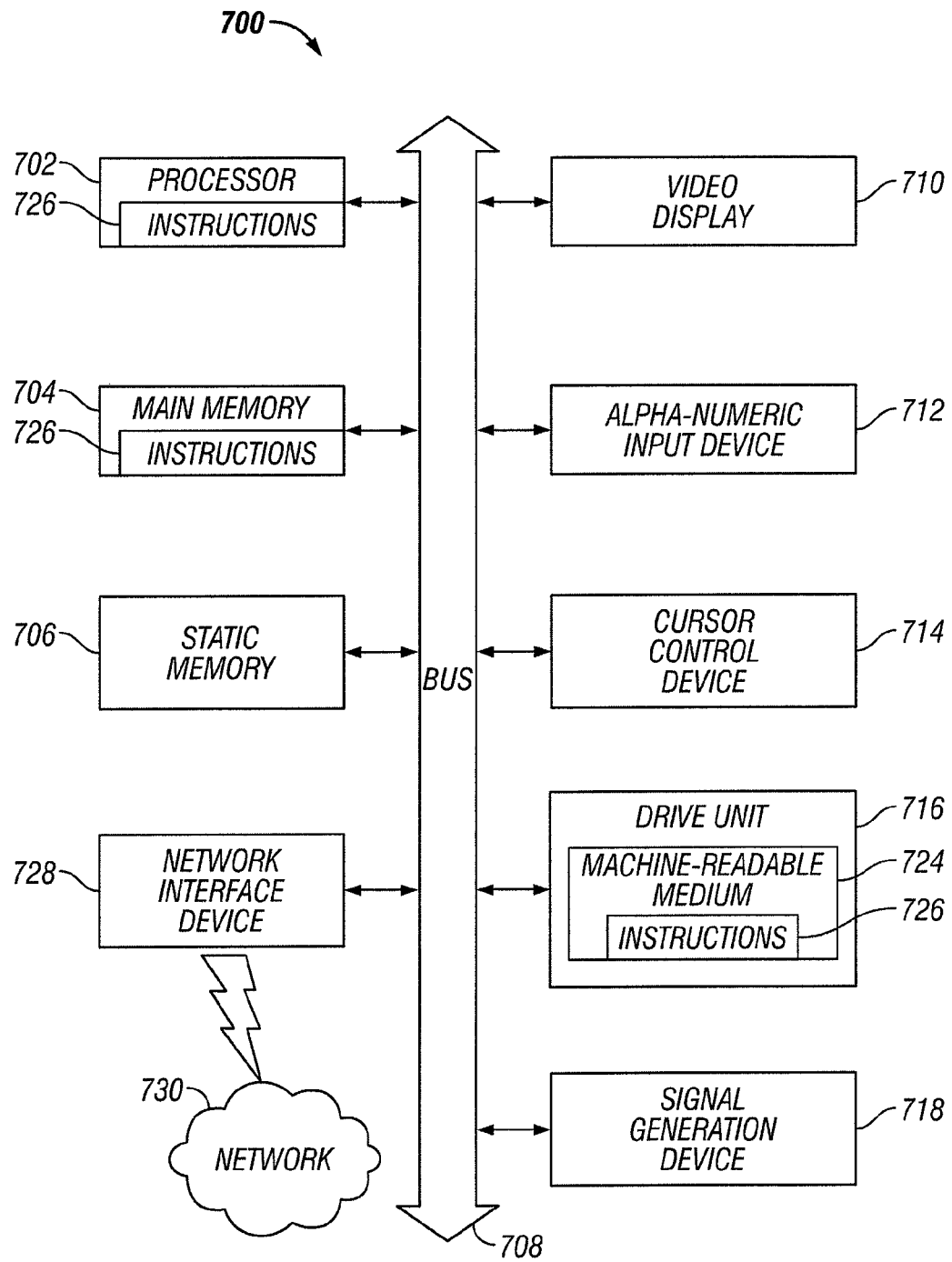
FIG. 7 is a block schematic diagram of a machine in the exemplary form of a computer system within which a set of instructions may be programmed to cause the machine to execute the logic steps of the invention.

FIG. 7 is a block schematic diagram of a machine in the exemplary form of a computer system 700 within which a set of instructions may be programmed to cause the machine to execute the logic steps of the invention.

In alternative embodiments, the machine may comprise a network router, a network switch, a network bridge, personal digital assistant (PDA), a cellular telephone, a Web appliance or any machine capable of executing a sequence of instructions that specify actions to be taken by that machine.

The computer system 700 includes a processor 702, a main memory 704 and a static memory 706, which communicate with each other via a bus 708. The computer system 700 may further include a display unit 710, for example, a liquid crystal display (LCD) or a cathode ray tube (CRT). The computer system 700 also includes an alphanumeric input device 712, for example, a keyboard; a cursor control device 614, for example, a mouse; a disk drive unit 716, a signal generation device 718, for example, a speaker, and a network interface device 720.

The disk drive unit 716 includes a machine-readable medium 724 on which is stored a set of executable instructions, i.e. software, 726 embodying any one, or all, of the methodologies described herein below. The software 726 is also shown to reside, completely or at least partially, within the main memory 704 and/or within the processor 702. The software 726 may further be transmitted or received over a network 728, 730 by means of a network interface device 620.

In contrast to the system 700 discussed above, a different embodiment uses logic circuitry instead of computer-executed instructions to implement processing entities. Depending upon the particular requirements of the application in the areas of speed, expense, tooling costs, and the like, this logic may be implemented by constructing an application-specific integrated circuit (ASIC) having thousands of tiny integrated transistors. Such an ASIC may be implemented with CMOS (complimentary metal oxide semiconductor), TTL (transistor-transistor logic), VLSI (very large systems integration), or another suitable construction. Other alternatives include a digital signal processing chip (DSP), discrete circuitry (such as resistors, capacitors, diodes, inductors, and transistors), field programmable gate array (FPGA), programmable logic array (PLA), programmable logic device (PLD), and the like.

It is to be understood that embodiments may be used as or to support software programs or software modules executed upon some form of processing core (such as the CPU of a computer) or otherwise implemented or realized upon or within a machine or computer readable medium. A machine-readable medium includes any mechanism for storing or transmitting information in a form readable by a machine, e.g. a computer. For example, a machine readable medium includes read-only memory (ROM); random access memory (RAM); magnetic disk storage media; optical storage media; flash memory devices; electrical, optical, acoustical or other form of propagated signals, for example, carrier waves, infrared signals, digital signals, etc.; or any other type of media suitable for storing or transmitting information.

Accordingly, although the invention has been described in detail with reference to particular preferred embodiments, persons possessing ordinary skill in the art to which this invention pertains will appreciate that various modifications and enhancements may be made without departing from the spirit and scope of the claims that follow.

The invention claimed is:

1. A system, comprising:
   a processor that is operatively coupled with a memory device;
   one or more output devices that are operatively coupled with the processor, wherein the output devices comprise at least a default output device;
   a device template database that is operatively coupled with the processor, wherein the device template database contains a plurality of templates corresponding to a plurality of three-dimensional objects, wherein each of the templates is previously, individually sourced by an operator;
   an algorithm database that is operatively coupled with the processor, wherein the algorithm database contains a plurality of algorithms that are individually programmed for imposing graphics into the plurality of templates;
   an output settings database that is operatively coupled with the processor, wherein the output settings database contains a plurality of output settings corresponding to each output device of the one or more output devices;
   wherein the processor is configured to present a browser-based interface to a user via a wide area network, wherein the browser-based interface further comprises tools for the user to specify one of the three-dimensional objects,
   tools for the user to specify one or more graphics to be printed onto a workpiece associated with the specified three-dimensional object, wherein the workpiece comprises any of an accessory or a replaceable part corresponding to the specified three-dimensional object, and wherein the specified qraphics comprise any of images, text, or any combination thereof; and
   tools for the user to change a specified output device from the default output device;
   wherein the processor is configured to automatically access a template from the template database that corresponds with the specified three-dimensional object;
   wherein the processor is configured to automatically apply for an algorithm from the algorithm database to impose the specified graphic into the template according to the output settings, thereby creating a unique file comprising a custom-designed template with user-selected graphics custom-sized for the workpiece associated with the specified three-dimensional object;
   wherein the processor is configured to send the unique file to the specified output device; and
   wherein the specified output device is configured to print the custom-designed template with user-selected graphics custom-sized on the workpiece associated with the specified three-dimensional object according to the unique file.

2. The system of claim 1, wherein the one or more output devices comprise at least a laser-engraving output device.

3. The system of claim 1, wherein the one or more output devices comprise at least a color printing and UV curing printing device.

4. The system of claim 1, wherein the one or more output devices comprise at least an impact printing device.

5. The system of claim 1, wherein the plurality of three-dimensional objects comprise at least any of cellular phones or personal digital assistant devices, wherein the replaceable part comprises a removable backing portion corresponding to one of the cellular phones or personal digital assistant devices, and wherein the device template database contains a plurality of templates corresponding to different removable backing portions.

6. The system of claim 1, wherein the output settings database contains speed, power, and focus settings for each output device of the one or more output devices.

7. The system of claim 1, wherein the browser-based interface further comprises tools for the user to specify text to be printed onto the specified workpiece associated with the three-dimensional object.

8. The system of claim 1, wherein the browser-based interface further comprises tools for the user to upload graphics to the processor.

9. The system of claim 1, wherein the specified three-dimensional object comprises a consumer electronics device.

10. The system of claim 1, wherein the replaceable part comprises a cover.

11. The system of claim 1, wherein the accessory comprises a case.

12. The system of claim 1, wherein the specified three-dimensional object comprises an object that the user already owns.

13. A method, comprising the steps of:
   populating a template database with a plurality of templates, wherein each template from the plurality of templates is sourced from a particular electronic device;
   populating an output settings database with a plurality of output settings for a plurality of output devices;
   populating an algorithm database with a plurality of algorithms, wherein each algorithm from the plurality of algorithms is configured to automatically impose graphics into any template from among the plurality of templates while taking output settings into account, wherein the graphics comprise any of images, text, or any combination thereof;

coupling the template database, the output settings database, and the algorithm database with a server-based processing engine;

providing a browser-based interface to a user via a wide area network, wherein the browser-based consumer interface is configured with tools for the user to specify custom graphics, comprising an image, text, or any combination thereof, for automatic imposition onto a workpiece associated with a three-dimensional object, wherein the workpiece comprises any of an accessory or a replaceable part corresponding to the three-dimensional object, for outputting on a particular output device;

accepting at least one user input via the browser-based interface, thereby specifying custom graphics and text for automatic imposition onto a particular workpiece associated with a particular three-dimensional object for outputting on the particular output device;

automatically accessing at least one template for the specified workpiece from the template database;

automatically accessing at least one layout algorithm for automatically imposing the user-specified custom graphics into the at least one accessed template;

automatically imposing the user-specified custom graphics into the at least one accessed template, thereby creating a unique file;

sending the unique file to the particular output device; and printing the specified custom graphics onto the specified workpiece.

14. The method of claim 13, wherein the specified three-dimensional object comprises a consumer electronics device.

15. The method of claim 13, wherein the three-dimensional object comprises an electronic device, wherein the workpiece comprises a replacement back cover for the electronic device, and wherein the step of printing the specified custom graphics comprises laser-engraving the specified custom graphics onto the replacement back cover.

16. The method of claim 15, further comprising the step of:
sending the replacement back cover to at least one consumer.

17. The method of claim 13, wherein the step of printing the specified custom graphics comprises color printing and UV curing.

18. The method of claim 13, wherein the step of printing the specified custom graphics comprises performing an impact printing process.

19. The method of claim 13, wherein the replaceable part comprises a cover.

20. The method of claim 13, wherein the accessory comprises a case.

21. The method of claim 13, wherein the specified three-dimensional object comprises an object that the user already owns.

22. A method for recording customized images and text on any of a plurality of disparate three-dimensional objects comprising the steps of:

populating a template database with a plurality of templates, wherein each template from the plurality of templates is sourced from a particular electronic device;

populating an output settings database with a plurality of output settings for a plurality of recording devices;

populating an algorithm database with a plurality of algorithms, wherein each algorithm from the plurality of algorithms is configured to automatically impose a graphic file and text into any template from among the plurality of templates while taking output settings into account;

coupling the template database, the output settings database, and the algorithm database with a server-based processing engine;

providing a browser-based consumer interface to a plurality of consumers via a wide area network, wherein the browser-based consumer interface is configured with tools for consumers to specify custom graphics and text for automatic imposition onto at least one particular electronic device for outputting on a particular recording device;

accepting at least one consumer input via said browser-based consumer interface, thereby specifying custom graphics and text for automatic imposition onto at least one particular electronic device for outputting on a particular recording device;

automatically accessing at least one template for the specified at least one particular device from the template database;

automatically accessing at least one layout algorithm for automatically imposing the user-specified custom graphic file and text into the at least one accessed template;

automatically imposing the user-specified custom graphic file and text into the at least one accessed template, thereby creating a unique file;

sending the unique file to a recording device from among the plurality of recording devices;

printing the specified custom graphic and text onto an electronic device;

accepting a plurality of consumer inputs via the browser-based consumer interface, thereby specifying custom graphics and text for automatic imposition onto a plurality of electronic devices for outputting on a recording device;

automatically accessing at least one template for the plurality of electronic devices from the said template database;

automatically accessing at least one layout algorithm for automatically imposing the user-specified custom graphic files and text into the at least one accessed template for each of the plurality of consumer inputs;

automatically imposing the user-specified custom graphic files and text into the at least one accessed template, thereby creating a unique file for each of the plurality of consumer inputs;

sending the unique files to the recording device; and printing the specified custom graphic and text onto each of the plurality of electronic devices.

23. The method of claim 22, wherein the output device comprises an on-site kiosk physically accessible by the plurality of consumers.

24. The method of claim 22, wherein the plurality of electronic devices comprises the same electronic device.

25. The method of claim 22, wherein the plurality of electronic devices comprises at least one electronic device that is different from at least one additional electronic device.

26. The method of claim 22, further comprising the step of:
managing the transmission of the unique files to the recording device via an operator interface.

27. The method of claim 22, wherein the step of populating an output settings database includes populating the output settings database with print speed, laser power, and laser focus settings for a plurality of recording devices.

28. The method of claim 22, further comprising the step of:
scaling the server-based processing engine with the ability to automatically impose custom graphics and text onto at least one additional electronic device by adding at least one new template for the at least one additional electronic device to the template database and by adding at least one new algorithm for the at least one additional electronic device to the algorithm database.

* * * * *